April 17, 1928.
E. C. BUNNELL
EYELASH APPLICATOR
Filed April 9, 1926
1,666,116
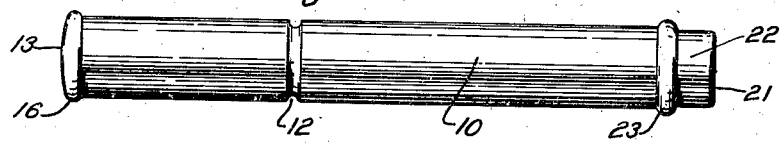
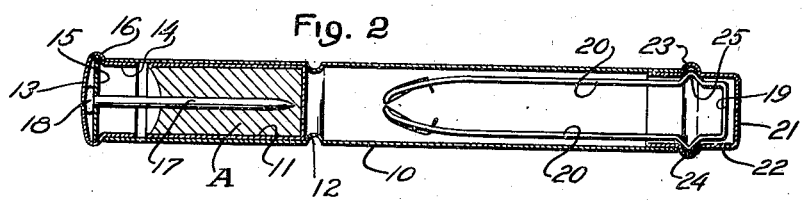
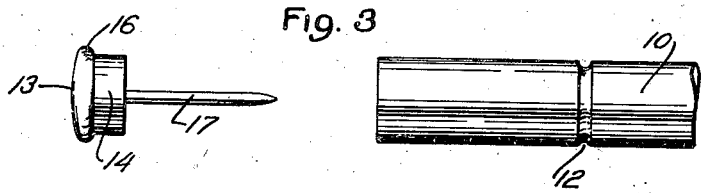
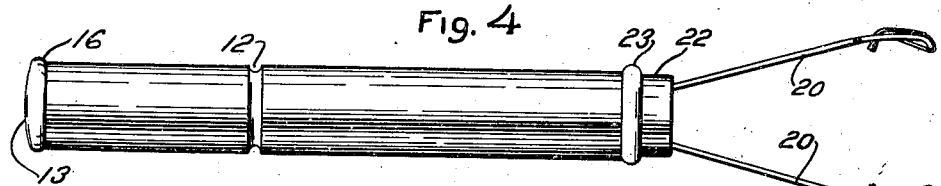
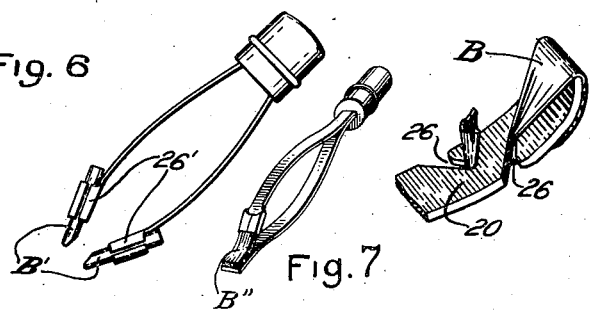
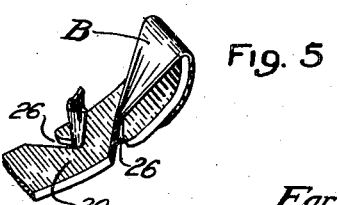
INVENTOR.
Earl C. Bunnell
BY
G. H. Braddock
ATTORNEY.

Patented Apr. 17, 1928.

1,666,116

UNITED STATES PATENT OFFICE.

EARL C. BUNNELL, OF STRATFORD, CONNECTICUT.

EYELASH APPLICATOR.

Application filed April 9, 1926. Serial No. 100,937.

This invention relates to an eyelash applicator, and an object of the invention is to produce a unique, useful and compactly arranged device that will be of especial concern to women, the device including a container for coloring material for eyelashes, an applicator proper for working the material upon and into eyelashes, a spreader adapted to the purpose of removing suitable quantities of the material from the container and tranferring it to the applicator, and an enclosing body of convenient and desirable shape and size for the container, applicator and spreader.

More specifically, the invention has for its objects to provide an applicator for coloring material which can be easily manipulated, will be efficient for its purpose, and will be of novel and improved design; to provide in connection with the applicator, a container for coloring material, and a spreader which is simplicity itself and capable of ideally transferring the exact preferred amount of material from the container to the applicator; and to provide an enclosing body or carrier for the container, spreader and applicator which can be manufactured at minimum expense and will be reliable in positively retaining the removable parts of the device against accidental displacement.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and meant in no way in a limiting sense, changes in details of construction and arrangement of parts being permissible so long as within the spirit of the invention and the scope of the appended claims.

In the accompanying drawing forming a part of this specification,

Fig. 1 is an elevational view of a device embodying the features of the invention;

Fig. 2 is a longitudinal sectional view of the device of Fig. 1;

Fig. 3 is an elevational view of the spreader and its cap and a portion of the enclosing body or shell, showing the spreader removed from the container and enclosing body;

Fig. 4 is an elevational view on an enlarged scale of the device as when the applicator proper is arranged for use;

Fig. 5 is a perspective view detailing certain features of the applicator proper of the device of Fig. 4;

Fig. 6 is a detail of a modified form of applicator; and

Fig. 7 is a detail of a second modified form of applicator.

With respect to the drawing and the numerals of reference indicated thereon, 10 denotes a cartridge or shell open at both ends and capable of functioning as the enclosing body of the novel device, and 11 denotes a container for eyelash coloring material snugly fitted in one end of the cartridge or shell 10, an inwardly extending bead 12, desirably made by depressing a portion of the shell for its full circumference, limiting the extent to which the container can move into the shell; that is to say, the bead provides a rest within the shell against which the bottom of the container is adapted to lie. The top edge of the container is well within the shell, as very clearly disclosed in Fig. 2.

A covering cap for the container, consisting of a head portion 13 and a skirt portion 14 snugly and removably fitted within the open end of the enclosing body or shell adjacent the container, is constructed to receive and retain a disk 15 between said head and skirt portion, the marginal edge of the disk being seated between the head and a shoulder 16 of the covering cap into which both the head and skirt merge. When the covering cap is inserted in the enclosing body or shell, the shoulder 16 obviously engages the before mentioned open end of the cartridge or shell. A spreader 17 passing through the disk and entering eyelash coloring material A in the container, is secured in position in the covering cap by means of an enlargement 18 upon an end of the spreader and between the head and disk.

The applicator proper, removably carried in the other end portion of the enclosing body or shell, may be a pair of tweezers or the like constituted by a base 19 and legs 20 of any preferred resiliency movable toward and from each other. An enclosing cap, consisting of a head 21 and a skirt 22 snugly and removably receivable in the other open end of the enclosing body or shell, may constitute the means for detachably connecting the applicator to the cartridge or shell when positioned either entirely in the shell, as in Fig. 2, or inserted for use, as in Fig. 4. To accomplish this, the skirt 22 may be provided intermediate its ends with an outwardly extending bead 23, desirably made by expanding a portion of the skirt for its entire circumference, providing an annular groove 24 within the enclosing cap, and the legs 20 may be shaped adjacent the base 19 to provide oppositely disposed protuberances or bulges 25 fitting in the groove. As will be obvious, either end of the skirt 22 may be first inserted in the cartridge or shell, depending upon whether the applicator is to be used, and the bead 23 will serve as a stop limiting the passage of the enclosing cap into the enclosing body or shell.

The working ends of the tweezers or the like may be constructed as in Figs. 2, 4 and 5, as in Fig. 6, as in Fig. 7, or in some other preferred manner. In Figs. 2, 4 and 5 each leg end is shown as provided with notches 26 to detachably receive a ribbon B, the ribbons being arranged over the ends of the legs 20. In Fig. 6 I have disclosed crayons B' detachably secured to the ends of the legs as at 26'. In Fig. 7 one of the legs has a brush B" secured to it.

It will be apparent that when the container, spreader and applicator proper are associated with the enclosing body or shell none of the removable parts of the device can become accidentally displaced.

To use the device, the enclosing cap is removed from the enclosing body, from the position in which shown in Fig. 2, and reinserted head end first, as in Fig. 4. The spreader is then manipulated to pick up some coloring material from the container and the material is afterwards transferred to the ribbons B, the crayons B', the brush B", or to some other device utilized. To apply the coloring material to eyelashes, the legs of the tweezers or the like are first positioned so that the ribbons B are upon opposite sides of the eyelashes and are then grasped by the fingers of one hand and made to engage and move over the eyelashes. When using crayons B', these would likewise be upon opposite sides of the eyelashes. When using a brush B" as in Fig. 7, the brush would be at one side of the eyelashes and the leg 20 would be at the opposite side. Clearly, each leg could carry a brush. The applicator proper and its retaining cap are, naturally, so constructed that movement of the working ends of the tweezers or the like to or toward each other will not remove the protuberance or bulges of the legs of the tweezers or the like from the groove of the enclosing cap. Obviously, with an applicator taking the form of those of Figs. 6 and 7 no spreader or container is necessary.

What I claim is:

1. A device of the character described, comprising an enclosing body, a container for coloring material removably secured therein, a coloring material spreader adapted to enter said container, and an applicator for the coloring material removably fitted in said enclosing body.

2. A device of the character described, comprising an enclosing body open at both ends, a container for coloring material removably secured in one end portion of said body, a covering cap for said mentioned end portion and carrying a coloring material spreader adapted to enter said container, and an applicator for coloring material removably fitted within the other end of said body.

3. A device of the character described, comprising a shell having an inwardly extending bead, a container for coloring material within an end portion of said shell and resting against said bead, a covering cap for said container, a spreader associated with said cap and removably located in said container, and a coloring material applicator removably situated in the other end portion of said shell.

4. A device of the character described, comprising a shell having an inwardly extending bead, a container for coloring material within an end portion of said shell and resting against said bead, a covering cap for said container and removably fitted in said shell, a spreader associated with said cap and adapted to enter said container, an enclosing cap for the opposite end of said shell, and a coloring material applicator inserted in said enclosing cap.

5. In a device of the character described, an enclosing body, an enclosing cap removably carried thereby, and a coloring material applicator carried by said enclosing cap, said cap having a skirt with bead providing a groove, and said applicator constituted by a pair of tweezers or the like having legs with bulges entering said groove, either end of said skirt being capable of insertion in said enclosing body.

6. A device of the character described, comprising an enclosing body open at both ends, a container for coloring material removably secured in one end portion of said body, a covering cap for said mentioned end portion and carrying a coloring material spreader adapted to extend into said container for approximately its full length, and an applicator for coloring material removably fitted within the other end of said body.

7. A device of the character described, comprising an enclosing body open at both ends, a container for coloring material removably secured in one end portion of said body, a covering cap for said mentioned end portion and carrying a coloring material spreader adapted to extend through approximately the full length of said container, and an applicator for coloring material fitted within the other end of said body, said applicator consisting of a pair of members, a connection between the same, and a coloring material carrying device upon a free end portion of one of said members, and said spreader being adapted to the purpose of placing coloring material from said container upon said coloring material carrying device.

Signed at Bridgeport, in the county of Fairfield, and State of Connecticut, this 8th day of April A. D., 1926.

EARL C. BUNNELL.